Feb. 10, 1970  H. R. E. MEIER  3,494,335
INTERNAL COMBUSTION ENGINE
Filed May 3, 1968  4 Sheets-Sheet 1
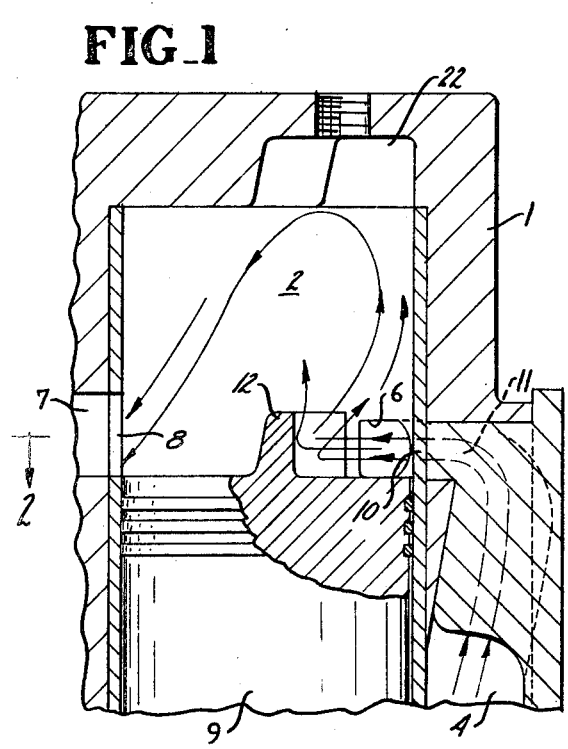
FIG_1
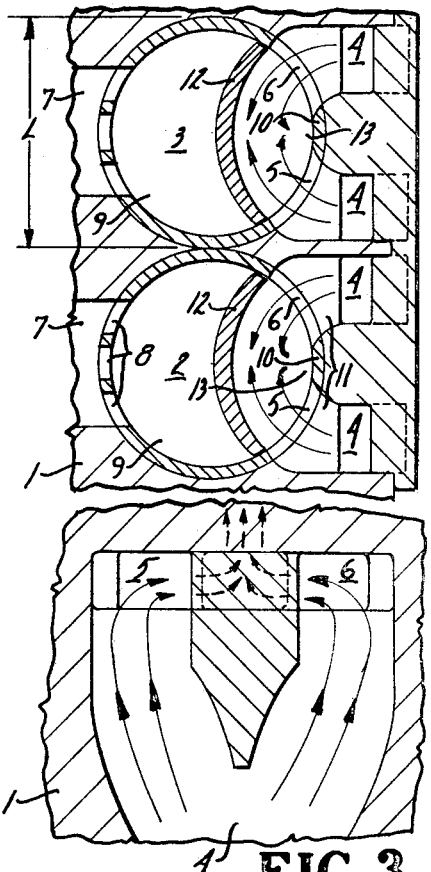
FIG_2
FIG_3
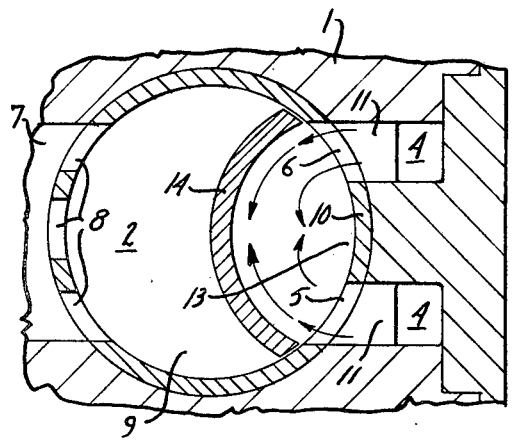
FIG_4
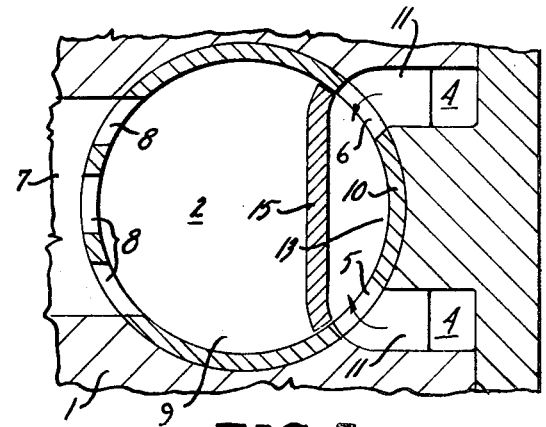
FIG_5
INVENTOR.
HERMANN R. E. MEIER
BY
Andrus & Starke
Attorneys

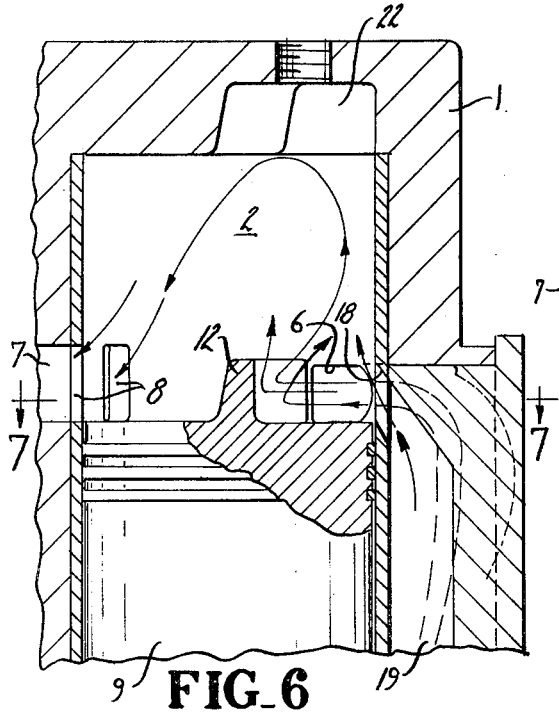
FIG_6
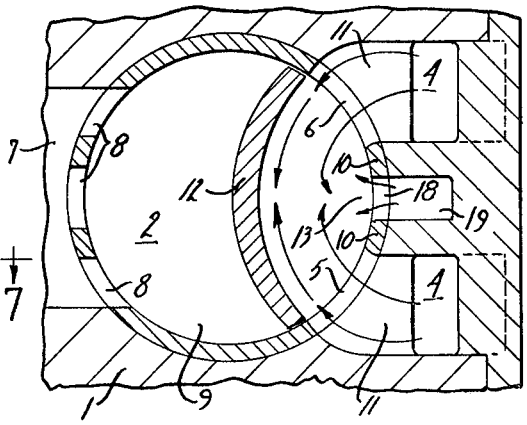
FIG_7
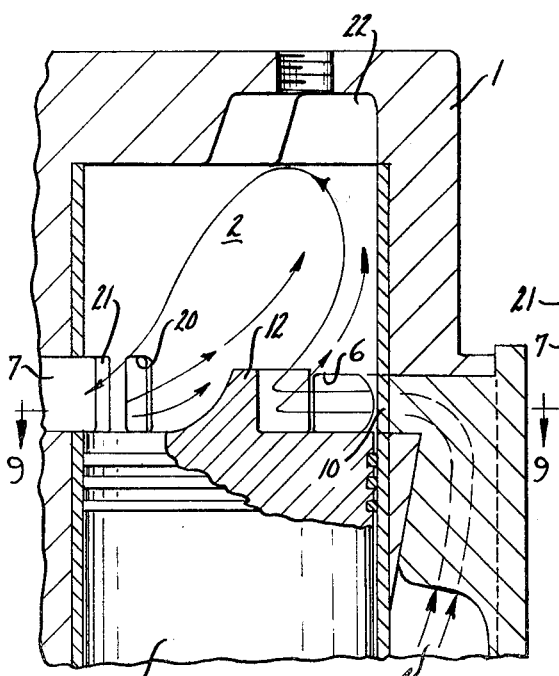
FIG_8
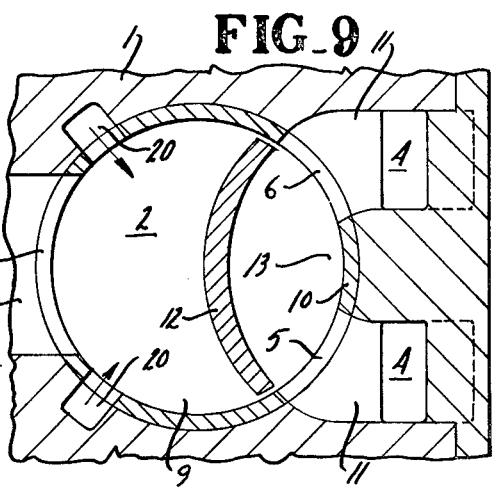
FIG_9
INVENTOR.
HERMANN R. E. MEIER
BY
Andrus & Stark
Attorneys Feb. 10, 1970     H. R. E. MEIER     3,494,335

INTERNAL COMBUSTION ENGINE

Filed May 3, 1968     4 Sheets-Sheet 3

INVENTOR.
HERMANN R. E. MEIER
BY
Andrus & Stoke
Attorneys

Feb. 10, 1970  H. R. E. MEIER  3,494,335
INTERNAL COMBUSTION ENGINE
Filed May 3, 1968  4 Sheets-Sheet 4

INVENTOR.
HERMANN R. E. MEIER
BY
Andrus & Starke
Attorneys

United States Patent Office 3,494,335
Patented Feb. 10, 1970

3,494,335
INTERNAL COMBUSTION ENGINE
Herman R. E. Meier, Oshkosh, Wis., assignor to Brunswick Corporation, Chicago, Ill., a corporation of Delaware
Filed May 3, 1968, Ser. No. 726,398
Int. Cl. F02f 3/24
U.S. Cl. 123—65                          12 Claims

ABSTRACT OF THE DISCLOSURE

In a two-stroke cycle internal combustion engine each transfer passage or inlet passage to the cylinder has either vanes, a sufficient length leading to the corresponding port or other means to pre-establish a flow substantially parallel to the top surface of the piston for the inlet gases. There are at least two spaced inlet ports with an intermediate wall section for the cylinder and the two streams of intake gases are directed by guide means on the piston crown or face toward the region immediately in front of the intermediate wall section from which the combined streams rise to the top of the cylinder as the combuster gases move downwardly and out through one or more exhaust ports on the side opposite to the inlet ports.

BRIEF DESCRIPTION OF THE INVENTION

This invention relates generally to two-cycle engines and more particularly to a scavenging system utilizing neither the loop nor cross scavenging principles, and wherein the transfer or inlet ports for the cylinders are generally on one side of the engine and the exhaust or outlet ports are on the opposite side of the engine.

Generally, cross scavenged engines are much lower in cost and easier to manufacture than loop scavenged engines. On the other hand it is generally recognized that loop scavenged engines are somewhat more efficient, producing generally more power per cubic inch of piston displacement and requiring less fuel per H.P. produced than cross scavenged engines.

The present invention combines the low initial engine cost of a cross scavenged engine with the higher efficiencies of a loop scavenged engine.

The ports are so disposed as to enable close arrangement of the cylinders side by side in a plane containing the crank shaft. This distinguishes the engine of the present invention from most loop scavenged engines wherein the transfer or intake ports generally interfere with a close or side by side arrangement of the cylinders. The ports are also arranged so as to enable the passageways to be die cast with ease and thus avoid the expensive machining and casting of loop scavenged engines.

Furthermore, the transfer or intake ports and the guides on the pistons of the present invention are constructed to greatly improve the scavenging of the cylinders and the efficiency of the engine while not increasing the manufacturing costs as compared to a cross scavenged engine.

This is accomplished by a combination of detail construction and operational features which distinguish the invention from the commercially feasible engines of the past. Such features may be listed generally as follows:

(1) The scavenging or combustible gases should enter the cylinder through the transfer or intake ports in a flow that is directed generally horizontally (i.e. parallel to a plane normal to the longitudinal center line of the cylinder and generally parallel to the flat top of the piston) as the gases flow into the cylinder upon uncovering of the port by the piston, and as distinguished from constructions of the customary cross scavenged engines wherein the gases usually enter the cylinder with an upward component of flow direction.

(2) The scavenging or combustible gases should enter the cylinder in two streams with an intermediate section of the cylinder wall therebetween on the intake side of the cylinder and with the streams initially directed generally away from the intermediate wall section, preferably substantially radial of the longitudinal axis of the cylinder.

(3) The direction of the flow of the two spaced streams of scavenging or combustible gases should be caused as by guide means on the piston to combine and engage each other just opposite said intermediate wall section of the cylinder and thereby caused to turn toward the intermediate wall section and upwardly to the top of the cylinder as a single composite stream and from thence generally across the cylinder and downwardly to an exhaust port or ports on the opposite side of the cylinder.

(4) A guide means on the face of the piston should be disposed with a substantially vertical face toward the inlet side and should be curved from end to end to gradually turn the direction of each stream of gas from the initial direction expressed under item 2 above to a direction of engagement of the streams as expressed under item 3 above. For this purpose the ends of the guides will have a direction generally corresponding to the initial direction of inflow of the gases through the port. As a possible modification the central portion of the guide may have a peak component facing the intermediate wall section of the cylinder so as to aid in turning the direction of flow of the gas streams toward the intermediate wall section.

(5) The peak component of the guide means may have a substantial fillet where it merges with the top face of the piston to thereby assist the streams in turning to an upward direction of flow in front of the intermediate wall section of the cylinder.

(6) Normally the height of the guide means should be as great as the vertical extent of the transfer or intake port so that at no position of the piston should there be freedom for the gases to flow directly over the top of the guide to the exhaust port.

(7) Where transfer passages are employed leading to the intake ports, they should be constructed to establish the initial flow directions for the streams of scavenging or combustible gases prior to entrance of the gases into the cylinder.

(8) Directional guide vanes may be employed in the transfer passage or ducts leading to the intake port to assist in establishing the initial direction of gas flow through the port.

(9) In all cases the two streams of gases flowing into the cylinder should engage and combine to form an upward flow pattern immediately in front of the intermediate section of the cylinder wall.

(10) For minimum cost and for ease of placing cylinders side by side, the transfer passages and duct construction should not extend laterally to any great extent to either side of the cylinder beyond the cylinder wall.

With the above features in mind reference is made to the accompanying drawings illustrating and best mode presently contemplated for carrying out the invention, and several modifications thereof.

In the drawings:

FIGURE 1 is a schematic transverse vertical section of one cylinder of an engine showing the piston at the bottom of its stroke as related to the intake and exhaust ports;

FIGURE 2 is a schematic transverse horizontal section of two adjacent cylinders of the engine taken generally upon line 2—2 of FIG. 1;

FIGURE 3 is a front elevational schematic diagram of the flow into the cylinder of FIG. 1;

FIGURE 4 is a view similar to FIG. 2, but of only one cylinder showing an inlet pattern wherein the two passages leading to the cylinder intake ports establish substantially parallel intake streams;

FIGURE 5 is a view similar to FIGS. 2 and 4 showing an inlet pattern wherein the two passages leading to the cylinder intake ports are generally opposite each other.

FIGURE 6 is a view similar to FIG. 1 in which an auxiliary inlet is provided between the major inlet streams and directed to assist in the upward scavenging flow of the intake mixture;

FIGURE 7 is a schematic transverse horizontal section taken on line 7—7 of FIG. 6;

FIGURE 8 is a view similar to FIG. 6 showing a modified auxiliary intake construction;

FIGURE 9 is a view similar to FIG. 7 taken on line 9—9 of FIG. 8;

Figure 10:
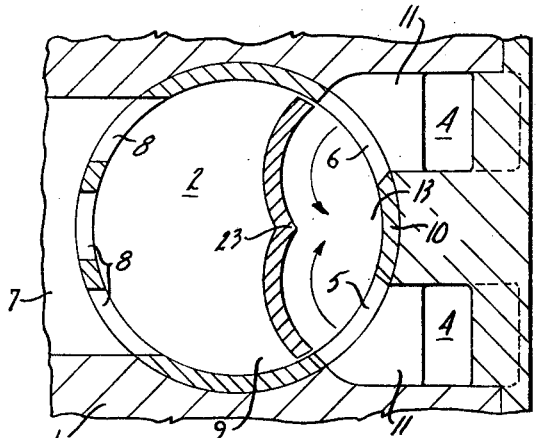
FIGURE 10 is a view similar to FIG. 2, but of one cylinder showing a modified construction of the guide on the piston.

Referring to FIGS. 1–3, the engine block 1 has a plurality of power cylinders 2 and 3 arranged closely side by side in the vertical plane of the crank shaft of the engine.

The block 1 has cast in one side thereof suitable transfer passages 4 leading customarily from the crank case, or from some other suitable pressure source of air or fuel-air mixture, to the several inlet ports, there being two intake ports 5 and 6 for each cylinder.

The incoming gas may be a fuel-air mixture, as with a conventional carbureted engine, or may be air only, as with a direct fuel injection engine.

The engine block 1 also has an exhaust manifold 7 on the side opposite the transfer passages 4 and which manifold 7 receives the products of combustion from the cylinders through one or more outlet or exhaust ports 8 from the respective cylinders.

Each cylinder has a piston 9 therein customarily connected to the crank shaft by a suitable connecting rod, not shown.

The exhaust ports 8 are disposed on the opposite side of the cylinder from the inlet ports 5 and 6 and the ports are disposed at relative heights to be respectively uncovered by the piston 9 at a time most effective for proper scavenging of the cylinder from exhaust and filling of the cylinder with a fresh charge.

In the engine illustrated the exhaust ports 8 are shown as being uncovered slightly ahead of the uncovering of the intake ports 5 and 6 as the piston 9 moves downwardly.

The wall section 10 between the two inlet ports 5 and 6 for each cylinder provides a surface which will assist in directing the combined gas flow upwardly.

In carrying out the present invention according to the embodiment in FIGS. 1–11, 13 and 14 the intake ducts or transfer passages 4 approach the corresponding intake ports 5 and 6 in the cylinder wall with a horizontal portion 11 to aid in giving the inlet gas flowing into the cylinder an established horizontal direction as distinguished from an upwardly slanting component. The flow of the intake gas is illustrated with broken lines and arrows indicating direction of flow.

The inlet gas enters the cylinder through ports 5 and 6 in a direction generally parallel to the flat horizontal face of piston 9 and initially follows along a curved guide 12 carried by the piston.

The guide 12 may constitute an upstanding flange-like member extending across the piston face in front of the ports 5 and 6 and which is sufficiently high relative to the ports to prevent the incoming gases from generally spilling over the top toward the outlet ports 8.

The front face of guide 12 is preferably perpendicular to the piston face and the guide is curved longitudinally to provide a generally arcuate chamber portion initially receiving the streams of inlet gases from either side and gradually changing their direction as indicated in the flow lines and arrows of FIG. 2 until the two streams meet and combine in the region 13 just in front of wall section 10.

The curvature for guide 12 illustrated in FIG. 2 may be selected to correspond generally to an arc having a radius not less than one-half nor more than twice the radius of the piston. The ends of the guide 12 are parallel to and located substantially in line with the corresponding sides of the piston. The guide 12 divides the piston face area into two parts with the portion on the intake side of the piston being of less area than that on the exhaust side. The axis for the arcuate curvature of the inlet side of guide 12 is parallel to the axis or line of action of the piston 9.

The construction as illustrated in FIG. 2 has the central portion of the guide 12 reaching almost to the axis of the piston, thus providing a space between the guide and the intermediate wall portion 10 in excess of one-half the radius of the piston. This has been found to provide a substantial area for the two streams of incoming gases to meet and combine before rising along wall section 10 to the top of the cylinder.

As the incoming streams meet and build up the pressure in region 13 they turn upwardly along the wall 10 to the top of the cylinder as indicated in FIG. 1 and similar figures, and thence form a loop that ends by a discharge of spent gases through ports 8 and a substantially complete filling of the cylinder chamber with a fresh charge of inlet gases.

Referring to region 13 it will be noted from FIG. 2 that a portion of the abutting streams of inlet gases are first turned generally toward wall section 10 and upon engaging it the combined stream is turned upwardly.

The direction of the intake gases through ports 5 and 6 is preferably close to radial as illustrated in FIG. 2. However, it is possible to vary the direction within limits as shown by the extreme flow directions of FIGURES 4 and 5.

In FIG. 4 the two gas streams are parallel as they approach and pass through their corresponding ports 5 and 6. For this the ends of the guide 14 are curved more to have end portions extending generally in the initial direction of gas flow.

In FIG. 5 the gas streams are opposed and nearly parallel as they approach and pass through their corresponding ports 5 and 6. For this the guide 15 may be substantially straight as shown.

In order to obtain adequate port area of the embodiment of FIG. 5 the inlet ducts 4 may have to extend beyond the lateral dimension "L" of the cylinder wall as shown in FIG. 2

Figure 14:
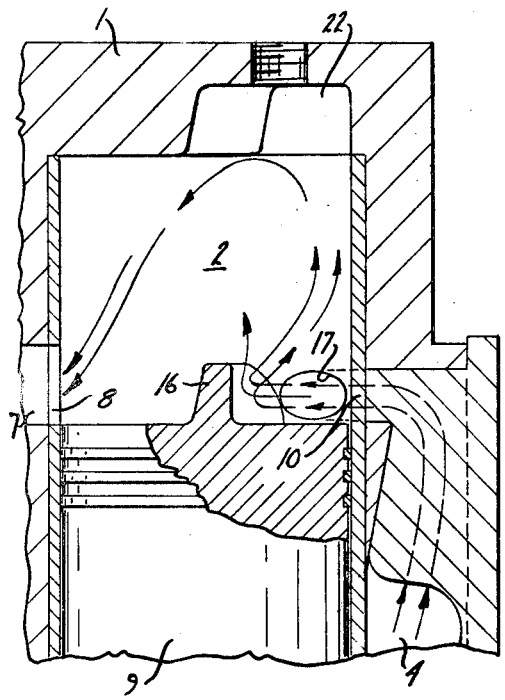
FIGURE 14 is a view similar to FIG. 1 showing a guide which is not of constant vertical height.

The top of the guide does not have to have the same vertical height across the cylinder. The ends may curve down as shown in FIG. 14 of the guide 16 as when the ends of the adjacent inlet port 17 are oval shape or are not of constant height.

In FIGS. 6 and 7 there is shown an auxiliary air or fuel mixture inlet 18 centrally of wall section 10 and which is connected to a transfer port or inlet passage 19 to aid in directing the incoming gases upward. This relatively small auxiliary stream mixes with the combined streams in region 13 and gives the gases an additional upward component.

In FIGS. 8 and 9 the auxiliary streams of intake gas come across from two inlet ports 20 on either side of a single exhaust port 21, and they function much like conventional loop scavenging ports except for the fact that the auxiliary inlets 20 are not spaced apart farther than is necessary to accommodate the exhaust port 21 therebetween, so that gas flow from the auxiliary ports 20 sweeps across the face of the piston 9 and over the top of guide 12 to impinge upon the upward stream of fuel mixture rising from region 13.

It will be noted that the top of the cylinder has a recess 22 immediately above region 13 to accommodate the spark plug, and which constitutes the combustion chamber.

Figure 11:
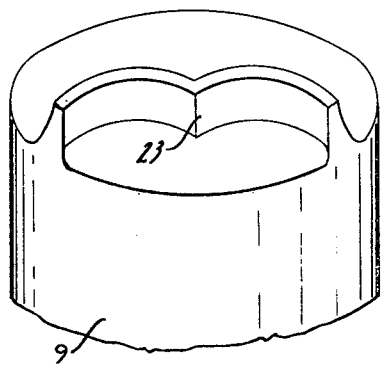
FIGURE 11 is a schematic perspective of the top of the piston employed in the construction of FIG. 10.

The shape of the guides 12, 14, 15 and 16 may also vary in providing a central peak 23 directing the inlet gases definitely toward wall section 10 in region 13, as shown in FIGS. 10 and 11.

Figure 12:
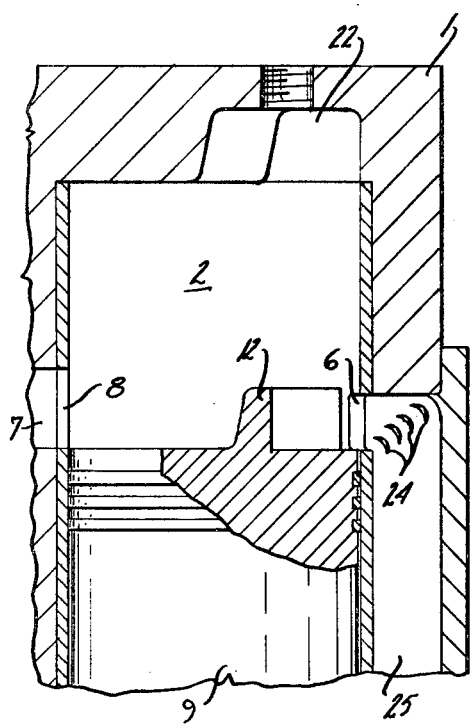
FIGURE 12 is a schematic section similar to FIG. 1 showing a modified transfer port construction employing guide vanes to establish the desired initial direction of flow for the intake.

FIG. 12 illustrates the use of turning vanes 24 in the intake passage or transfer port 25 immediately ahead of inlet ports 5 and 6. The vanes 24 tend to establish the desired direction for the stream just before it passes through either port 5 or 6, and therefore constitute an alternative structure to that provided by the duct portion 11 of the other embodiments. It is possible to employ a combination of vanes 24 and duct portions 11 to more effectively establish the flow direction through the inlet ports.

Figure 15:
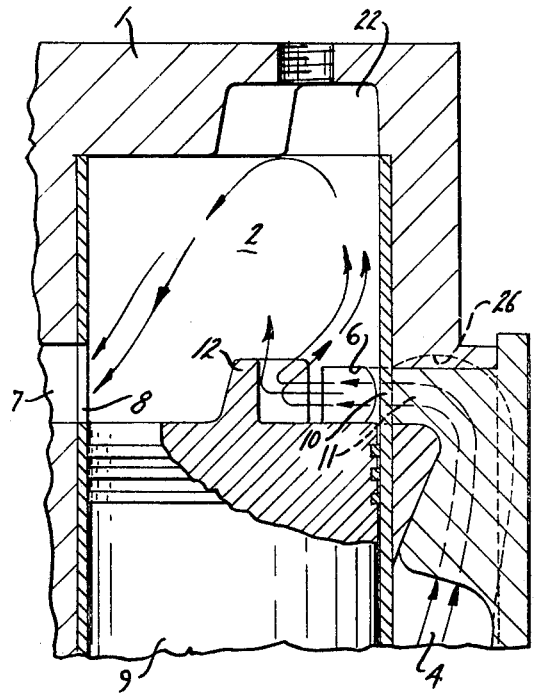
FIGURE 15 is a view similar to FIG. 1 showing a modified form of inlet port.

A variation of duct shape which provides a downward component for a portion of the stream flowing through the intake port is shown in FIG. 15 where the upper end 26 of the duct portion 11 is recessed preferably on a curvature that directs the outer portion of the gas stream downwardly as it enters the cylinder through the intake port, thus counteracting the upward thrust of the inner portion of the gas stream as it enters through the intake port.

Figure 13:
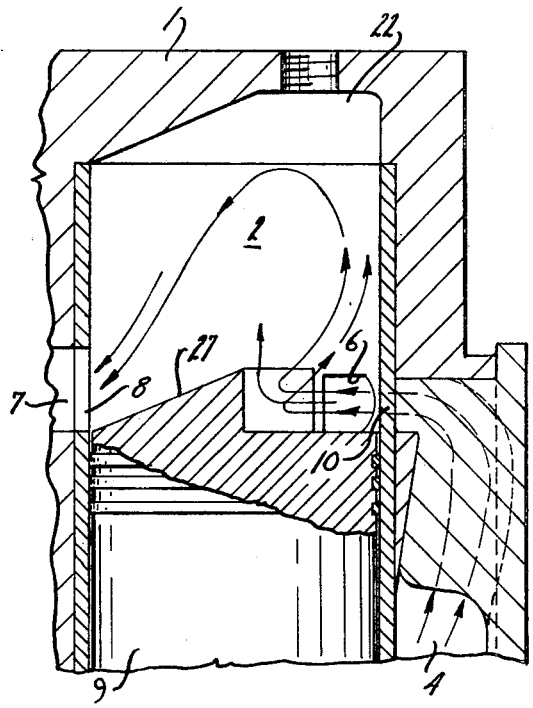
FIGURE 13 is a view similar to FIG. 1 illustrating a piston with an exhaust ramp rather than a flat top piston, with a wall type guide.

Any of the aforementioned embodiments may incorporate an exhaust ramp 27 on the exhaust side of the piston such as shown in FIG. 13 instead of a wall-like guide. The inlet side of the guide should still be essentially vertical.

It will be noted that in the longitudinal direction of the crankshaft, the various passages need not extend beyond the lateral dimension "L." It is therefore possible to position the cylinders close to one another and provide a compact, lightweight engine. Furthermore, the casting of an engine block of this type is much simple than it is for the generally more complicated blocks of the loop scavenging type.

Various modes of carrying out the invention are contemplated as being within the scope of the following claims particularly pointing out and distinctly claiming the subject matter which is regarded as the invention.

I claim:

1. A two cycle engine having a piston reciprocating in a closed cylinder with generally oppositely disposed inlet and outlet ports in the cylinder wall and a guide means on the face of said piston between the inlet and the outlet ports, characterized by two circumferentially spaced inlet ports with an intermediate section of the cylinder wall therebetween, said guide means having a wall on the inlet side of said piston substantially parallel to the axis of said cylinder terminating adjacent the outer ends of the inlet ports and curved to gradually turn the two streams of incoming gases toward a region where said streams combine immediately adjacent the intermediate wall section from which region the gas stream rises to the top of the cylinder and downwardly toward the outlet port in the general form of a loop, and means to establish an initial flow direction for the incoming streams that is generally perpendicular to the wall of the cylinder and generally parallel to the portion of said guide means immediately adjacent the corresponding inlet port.

2. The engine of claim 1 in which said last named means comprises a duct portion pre-establishing the direction of flow of the two streams prior to passage through the corresponding inlet ports.

3. The engine of claim 1 in which said last named means comprises vanes in the passage leading to the inlet ports to pre-establish the direction of flow of the two streams.

4. The engine of claim 1, in which said last named means comprises at least in part a vertical duct for each port, and a curved recess in the upper end of each vertical duct just ahead of the corresponding intake port to give a downward component to a portion of the gas stream as it enters the corresponding inlet port.

5. The engine of claim 1 and an additional inlet port means directing an auxiliary stream of inlet gases upwardly to mix with the combined streams rising from the region between said guide and said intermediate wall section.

6. The engine of claim 5 in which said additional port means is disposed in said intermediate wall section and the passage leading to said port means directs the auxiliary flow of gases angularly upward therethrough.

7. The engine of claim 5 in which said additional port means comprises an auxiliary inlet port on each side of a central outlet port and which directs intake gases across the top of the piston and upwardly over said guide.

8. The engine of claim 5 in which said additional port means comprises an auxiliary inlet port or ports located in the exhaust side of the cylinder and which directs intake gases across the top of the piston and upwardly over said guide.

9. A two-stroke cycle internal combustion engine comprising a piston, a cylinder having two circumferentially spaced inlet ports adapted to be covered and uncovered by movement of the piston and adapted to direct two incoming gas streams in the plane of the working face of said piston, said piston embodying a generally arcuate wall-like guide disposed on the working face of said piston, the axis of the line of action of the piston and the axis of the arc being substantially parallel, the radius of said arc being not less than one-half nor more than twice the radius of said piston, the ends of said guide being parallel to and located substantially in line with the corresponding sides of said piston, and said guide dividing the piston face area into two parts with the area on the intake side of the piston being less than the area on the exhaust side, and said guide having its ends respectively registering with the far edge of the corresponding inlet port so that the curved guide serves to direct the two incoming gas streams toward each other in the region immediately in front of the guide.

10. A two cycle engine having a piston reciprocating in a cylinder with oppositely disposed inlet and outlet ports in the cylinder wall and a guide on the face of the piston between the inlet and the outlet ports, the cylinder wall having two circumferentially spaced inlet ports with a section of the cylinder wall therebetween, said guide being substantially parallel to the cylinder axis on the inlet side of said cylinder with the ends of the guide adjacent the ends of the corresponding inlet ports and spaced away from the intermediate wall section, the inlet side of said guide being curved to gradually turn the two streams of incoming gases toward a region where said streams combine immediately adjacent the intermediate wall section, and means to establish an initial flow direction in a plane generally normal to the cylinder axis through said inlet ports into the cylinder for the incoming streams which is generally parallel to the portion of the guide adjacent each corresponding port.

11. A scavenging system for a two cycle engine having inlet and outlet ports on opposite sides of the cylinder and wherein:

(1) the piston has a guide extending fully across the piston face, said guide being essentially vertical on the inlet side of said piston and said piston face on said inlet side being generally flat in a plane substantially normal to the axis of the piston;

(2) the cylinder wall contains at least two inlet ports adjacent the opposite ends of said guide and separated by an intermediate section of cylinder wall therebetween;

(3) passageways in the cylinder block extending from a source of gas pressure and containing means to direct the flow through said ports so that said flow is essentially parallel said piston face and is essentially parallel said piston guide at the corresponding extremities thereof;

(4) the guide directs the flows from said ports so that said flows strike each other and combine to form a common stream which thereafter flows upwardly toward the closed end of said cylinder;

(5) one or more exhaust ports are located in said cylinder wall essentially opposite said inlet ports; and (6) said common stream flows up the inlet side of said cylinder toward the cylinder head, across the cylinder and downwardly toward said exhaust port.

12. A two cycle engine having a piston reciprocating in a cylinder with oppositely disposed inlet and outlet ports in the cylinder wall and a single guide on face of the piston between the inlet and the outlet ports, the cylinder wall having two circumferentially spaced inlet ports with a section of the cylinder wall therebetween, said guide being substantially parallel to the cylinder axis on the inlet side of said cylinder with the ends of the guide adjacent the far ends of the corresponding inlet ports and being centrally spaced from said intermediate wall section to provide a space therebetween of not less than about one-half the radius of the piston, the face of the piston between said guide and said inlet ports and cylinder wall section being generally flat in a plane substantially normal to the axis of the piston, and means to establish an initial flow direction for the incoming streams through said inlet ports into the cylinder in a plane generally normal to the cylinder axis and generally parallel to the portion of the guide adjacent each corresponding port.

References Cited

UNITED STATES PATENTS

| | | | |
|---|---|---|---|
| 543,614 | 7/1895 | Day. | |
| 1,311,944 | 8/1919 | Appel | 123—65 |
| 1,128,234 | 2/1915 | Dickson | 123—65 |
| 1,734,459 | 11/1929 | Curtis | 123—65 |
| 2,002,668 | 5/1935 | Lack | 123—65 |
| 1,649,554 | 11/1927 | Sweet. | |
| 2,085,035 | 6/1937 | Meredith. | |
| 2,115,657 | 4/1938 | Venediger. | |
| 2,294,332 | 8/1942 | Erickson. | |
| 2,443,502 | 6/1948 | Guerasimoff. | |
| 2,979,045 | 4/1961 | Busch. | |

FOREIGN PATENTS

| | | |
|---|---|---|
| 775,698 | 7/1934 | France. |
| 1,130,767 | 10/1956 | France. |
| 1,219,961 | 12/1959 | France. |
| 709,639 | 2/1940 | Germany. |
| 876,337 | 3/1953 | Germany. |
| 15,180 | 4/1900 | Sweden. |
| 50,742 | 12/1910 | Switzerland. |

WENDELL E. BURNS, Primary Examiner

U.S. Cl. X.R.

123—73, 74, 193